Figure 1:
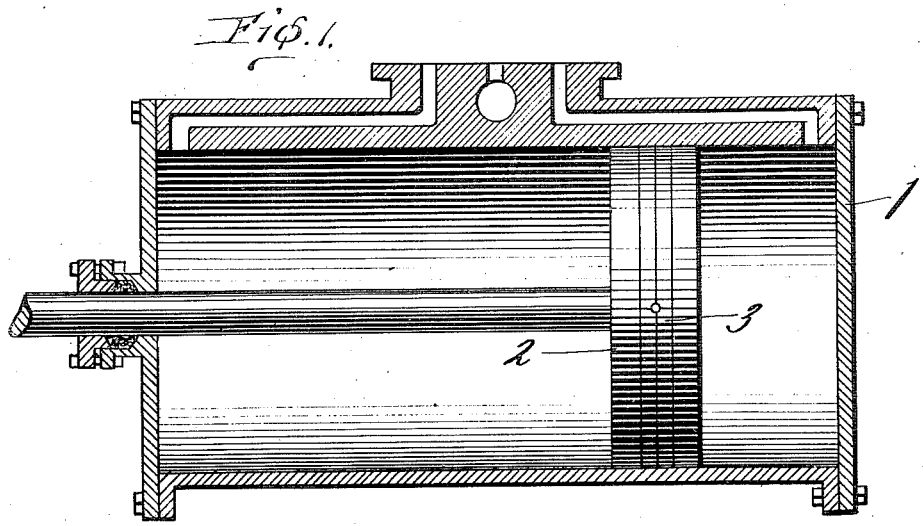

J. J. HELLING.
PACKING RING.
APPLICATION FILED DEC. 7, 1910.

1,005,970.

Patented Oct. 17, 1911.

Witnesses
J. M. Fowler Jr.
R. R. Duffie

Inventor
J. J. Helling
By John R. Duffie
His Attorneys

UNITED STATES PATENT OFFICE.

JULIUS J. HELLING, OF UNION, MISSOURI.

PACKING-RING.

1,005,970.

Specification of Letters Patent.

Patented Oct. 17, 1911.

Application filed December 7, 1910. Serial No. 596,077.

*To all whom it may concern:*

Be it known that I, JULIUS J. HELLING, a citizen of the United States, residing at Union, in the county of Franklin and State of Missouri, have invented certain new and useful Improvements in Packing-Rings, of which the following is a specification.

This invention relates to improvements in packing rings.

The primary object of this invention is to provide a packing ring that will expand of its own accord to compensate for wear, thus remaining air tight until the wearing parts have become worn into.

A further object of this invention is to provide a packing ring that does not require the use of set screws, and other like objectionable devices.

With the foregoing and other objects in view, the invention consists in the novel features of construction, combination and arrangement of parts illustrated in the drawings and more particularly pointed out in the appended claims.

Figure 2:
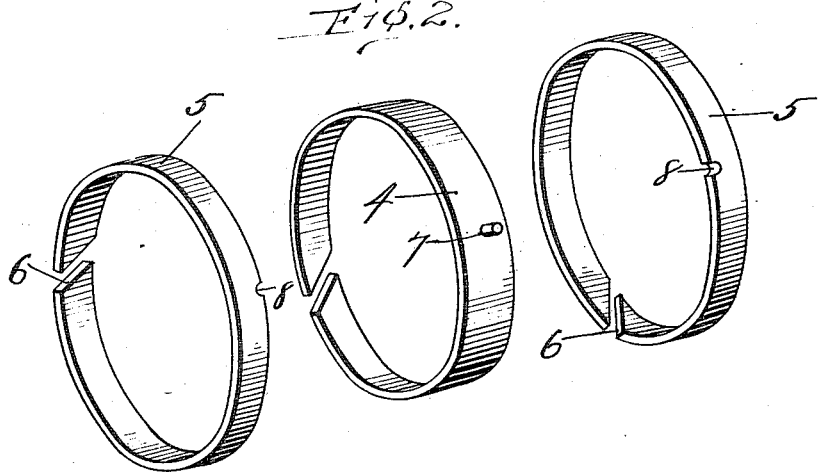

In the accompanying drawings:—Figure 1 is a sectional elevation of a piston and cylinder, illustrating the application of the packing ring, and Fig. 2 is a perspective view of the ring, with the parts shown in juxtaposition.

Referring to the drawings for a more particular description of the invention, 1 indicates the cylinder, 2 the piston and 3 the packing ring. Specifically, the packing ring comprises the inner split expanding ring 4, and the outer bearing rings 5, which are also split, as at 6. The bearing rings 5 are each, exactly one half the width of the expanding ring 4 so that when the rings 5 are fitted on the ring 4 the edges of the rings will be flush. The expanding ring 4 is provided on its periphery at a point centrally of the width thereof with the radially projecting stud 7 adapted to engage notches 8 formed in the inner edges of the outer or bearing rings 5 when the parts are assembled, which prevents any rotary displacement of the bearing rings.

When the parts comprising the ring are assembled, the ring is mounted in the usual recess in the piston, and it is obvious that as the bearing rings 5 become worn, the inner or expanding ring 4 will expand accordingly to keep the bearing rings pressed in air tight contact with the inner wall of the cylinder.

It is to be understood that the use of my improved packing ring is not confined to pistons alone, but that it may be used in any other connection where a ring of this character would be desired. It will also be understood that the ring may be made of different diameters and widths to meet the requirements in each particular case.

From the foregoing description taken in connection with the drawings, it is thought that the construction and advantages of this packing ring will be readily understood without requiring a more extended explanation.

Having described my invention, what I claim as new and desire to secure by Letters Patent, is:—

A packing ring of the class described comprising an inner split expanding ring provided on its periphery with a centrally disposed radially projecting stud and a pair of outer bearing rings split at directly opposite points at their circumference and provided in their inner edges with co-incident notches to receive the stud of the expanding ring, the bearing rings fitting on the outside of the expanding ring with their inner edges contiguous, and each being half the width of the expanding ring.

In testimony whereof I affix my signature in presence of two witnesses.

JULIUS J. HELLING.

Witnesses:
SEBASTIAN WALZ,
R. W. HELLING.